US006742498B2

(12) United States Patent
Mabuchi et al.

(10) Patent No.: US 6,742,498 B2
(45) Date of Patent: Jun. 1, 2004

(54) APPARATUS AND METHOD FOR CONTROLLING INTERNAL COMBUSTION ENGINE

(75) Inventors: Mamoru Mabuchi, Kariya (JP);
Toshiki Matsumoto, Kariya (JP);
Yoshifumi Kato, Nishikamo-gun (JP)

(73) Assignee: Denso Corporation, Kariya (JP)

( * ) Notice: Subject to any disclaimer, the term of this patent is extended or adjusted under 35 U.S.C. 154(b) by 75 days.

(21) Appl. No.: 10/100,106

(22) Filed: Mar. 19, 2002

(65) Prior Publication Data

US 2002/0132701 A1 Sep. 19, 2002

(30) Foreign Application Priority Data

Mar. 19, 2001 (JP) ........................................ 2001-077395

(51) Int. Cl.[7] .............................................. F02D 41/08
(52) U.S. Cl. ............................ 123/339.16; 123/339.18; 701/110
(58) Field of Search ....................... 123/339.16, 339.18; 701/110

(56) References Cited

U.S. PATENT DOCUMENTS

| | | | | |
|---|---|---|---|---|
| 5,078,109 A | * | 1/1992 | Yoshida et al. ............. | 123/399 |
| 5,245,966 A | | 9/1993 | Zhang et al. ........... | 123/339.19 |
| 5,864,770 A | * | 1/1999 | Ziph et al. ............. | 123/339.16 |
| 6,119,063 A | * | 9/2000 | Hieb et al. .................. | 701/110 |
| 6,144,913 A | * | 11/2000 | Braun et al. ................ | 701/110 |
| 6,379,283 B1 | * | 4/2002 | Cullen ........................ | 477/110 |
| 6,401,026 B2 | * | 6/2002 | Robichaux et al. .... | 123/339.19 |
| 6,461,274 B1 | * | 10/2002 | Genise et al. ............... | 477/109 |

* cited by examiner

Primary Examiner—Erick Solis
(74) Attorney, Agent, or Firm—Nixon & Vanderhye P.C.

(57) ABSTRACT

An apparatus for controlling an internal combustion engine calculates a target indicated torque and determines operating degree for engine control actuators such as an air system, a fuel system and an ignition system. The target indicated torque for an idling condition of the engine is calculated based on a constant target indicated power, e.g. the constant target indicated power has a value that corresponds to or slightly overcomes internal and external loss when the engine is in the idling. Although an idling speed control with a feedback control method is inhibited during a transient condition of the engine, the constant target indicated power provides a self-stabilizing to maintain the engine speed constant. As a result, the apparatus maintain the engine speed constant during the idling even external disturbance is applied to the engine.

18 Claims, 9 Drawing Sheets

APPARATUS AND METHOD FOR CONTROLLING INTERNAL COMBUSTION ENGINE

CROSS REFERENCE TO RELATED APPLICATION

This application is based on Japanese Patent Application No. 2001-77395 filed on Mar. 19, 2001 the contents of which are incorporated herein by reference.

BACKGROUND OF THE INVENTION

1. Field of the Invention

The present invention relates to an apparatus and method for controlling an internal combustion engine (engine).

2. Description of Related Art

It is proposed that a vehicular engine control system using an electronic controller which executes a torque demand control for setting an improved drivability having a quick response to an operation of an accelerator pedal by a driver of the vehicle. In this control method, the controller determines a desired accelerating power or target output torque demanded by the driver based on an operating degree of the accelerator pedal, an engine speed and the like. Then the controller determines operation degree of actuators, such as an opening degree of a throttle valve, a fuel amount injected from injectors, ignition timing of ignition devices and the like. Specifically, a target output torque may be calculated based on the operating degree of the accelerator pedal and the engine speed. A target indicated torque is calculated to add a loss torque of the engine to the calculated target output torque. Then, the opening degree of the throttle valve, the fuel amount and the ignition timing are determined based on the calculated target indicated torque.

Here, the target output torque Tot is a desired value or a target value of a net torque that is obtained on a crankshaft. The target indicated torque Tit is a desired value or a target value of a combustion torque generated by combustions of the engine. The loss torque Tl includes an internal less such as a friction loss in the engine and a torque lost by accessories such as an oil pump, an alternator and the like. A relationship among the values can be expressed by the following expression: Tit=Tot+Tl.

SUMMARY OF THE INVENTION

It is important in an idling condition of the engine to maintain the engine speed in a constant manner even if an external disturbance is applied to the engine. However, the conventional torque demand control doesn't consider a stability of the engine speed in the idling. Hereinafter, the engine speed in the idling is referred to as an idling speed.

Therefore, it is an object of the present invention to provide an apparatus for controlling the internal combustion engine that executes the torque demand control adapted to the idling.

It is a further object of the present invention to provide an apparatus for controlling the internal combustion engine which is capable of stabilizing the idling speed even if the external disturbance is applied.

It is a still further object of the present invention to provide an apparatus for controlling the internal combustion engine which is capable of stabilizing the idling speed even if a feedback control of the idling speed is not executed.

It is another object of the present invention to provide a method for controlling the internal combustion engine that is adapted to the idling.

It is a still another object of the present invention to provide a method for controlling the internal combustion engine which is capable of keeping a stability of the idling speed even if the external disturbance is applied.

It is a yet another object of the present invention to provide a method for controlling the internal combustion engine which is capable of keeping a stability of the idling speed even if a feedback control of the idling speed is not executed.

According to the present invention, at least one of actuators which are capable of varying output of the engine is controlled in accordance with a target indicated power that is substantially constant when the engine is in an idling. In the idling of the engine, an operator of the engine, e.g. a driver, doesn't operate an accelerator. Therefore, the engine is controlled based on a constant target indicated power. In case of maintaining the target indicated power constant, the output torque of the engine increase as the engine speed decreases. Therefore, if the engine speed increases while the idling, the output torque decreases to decrease the engine speed. That is, according to the present invention, a self-stabilizing method for controlling the engine speed is provided.

An idling speed control may be combined so that an idling speed control with a feedback control method maintains the engine speed at a target engine speed. The self-feedback provided by the constant target indicated power stabilizes the engine speed when the idling speed control with the feedback control method is inhibited.

The target indicated power may correspond to or slightly overcome a loss torque including internal and external losses when the engine is in the idling.

The engine may be controlled in accordance with a target indicated torque when a vehicle driven by the engine is in a driving condition. In the driving condition, the target indicated torque is set based on a target output torque reflecting the operating degree of an accelerator and a loss torque including internal and external losses when a vehicle driven by the engine is in a driving condition.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF PREFERRED EMBODIMENTS

Figure 1:
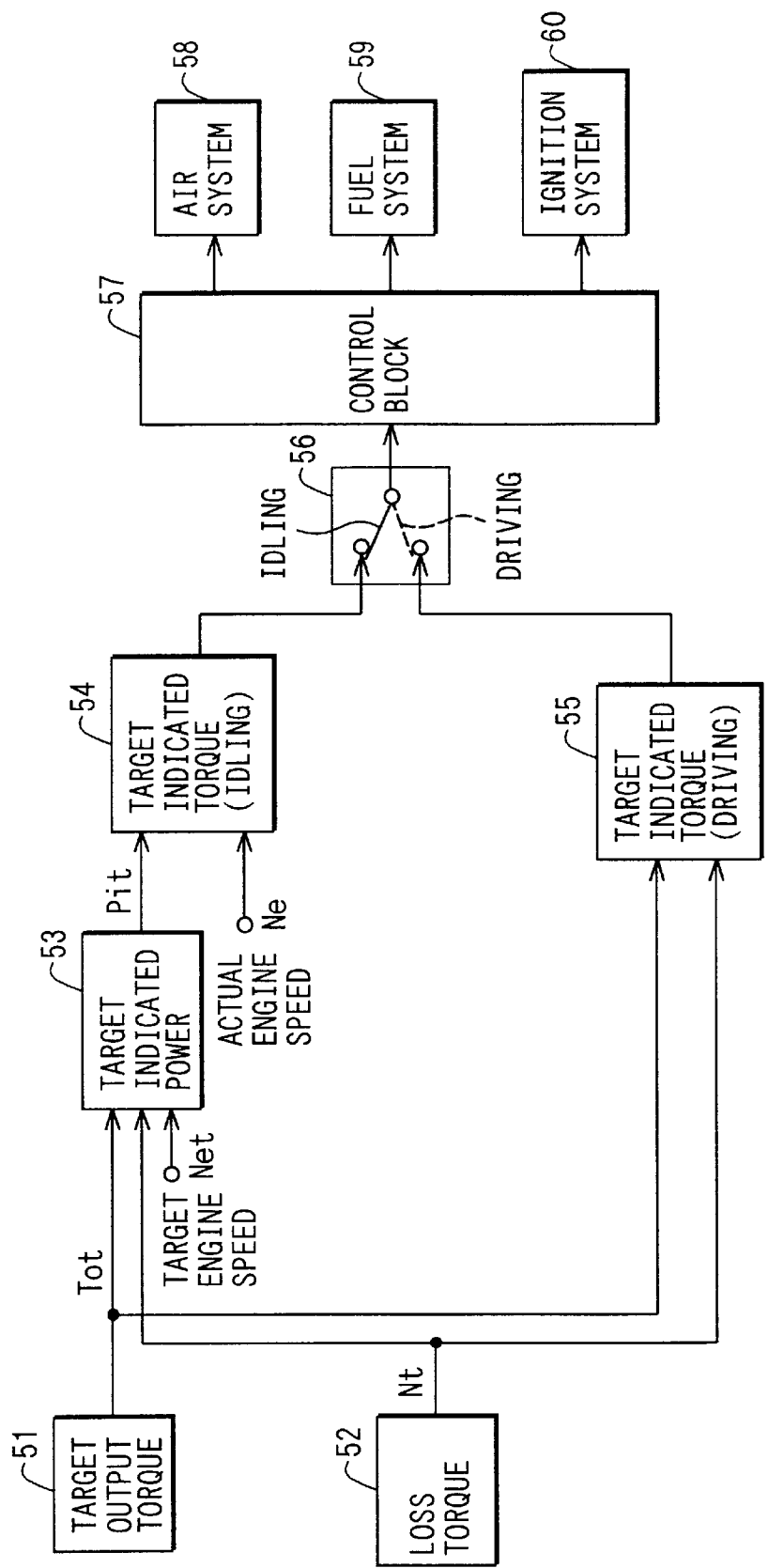
FIG. 1 is a block diagram of a control system according to a first embodiment of the present invention.

In the following embodiments, a torque demand control is carried out based on a control system as shown in FIG. 1. The control system has a block 51 that obtains a target output torque Tot based on an operating degree of the accelerator pedal and the like. The system also has a block 52 that obtains a loss torque Tl including an internal friction loss, an external friction loss and a driving torque for the accessories, e.g. an oil pump, an alternator, a compressor for an air conditioner, a torque converter, a pump for a power steering mechanism and the like. The system has a block 53 that obtains a target indicated power Pit calculated from the target output torque Tot, the loss torque Tl and a target engine speed Net. The system has two blocks 54 and 55 that obtain a target indicated torque Tit. The first block 54 obtains the target indicated torque Tit for the idling condition that is calculated from the target indicated power Pit and an actual engine speed Ne. On the contrary, the second block 55 obtains the target indicated torque Tit for a driving condition of the vehicle. A switching block 56 is switched to select the target indicated torques from the blocks 54 and 55 in accordance with a condition of the vehicle. A control block 57 determines operating degrees for actuators 58, 59 and 60. The air system actuator 58 may include at least one of a throttle valve, an idle speed control valve and a variable valve control actuator. The fuel system actuator 59 may include a fuel injector. The ignition system actuator 60 may include an ignition circuit for varying the ignition timing in an advance and retard direction. For instance, the control block 57 increases the operating degree for the throttle valve to increase an intake air amount as the target indicated torque Tit is increased. Although the system obtains the target indicated power Pit based on the target output torque Tot, the target output torque Tot can be set "0" and a calculation of the block 51 may be inhibited during the idling.

Figure 2:
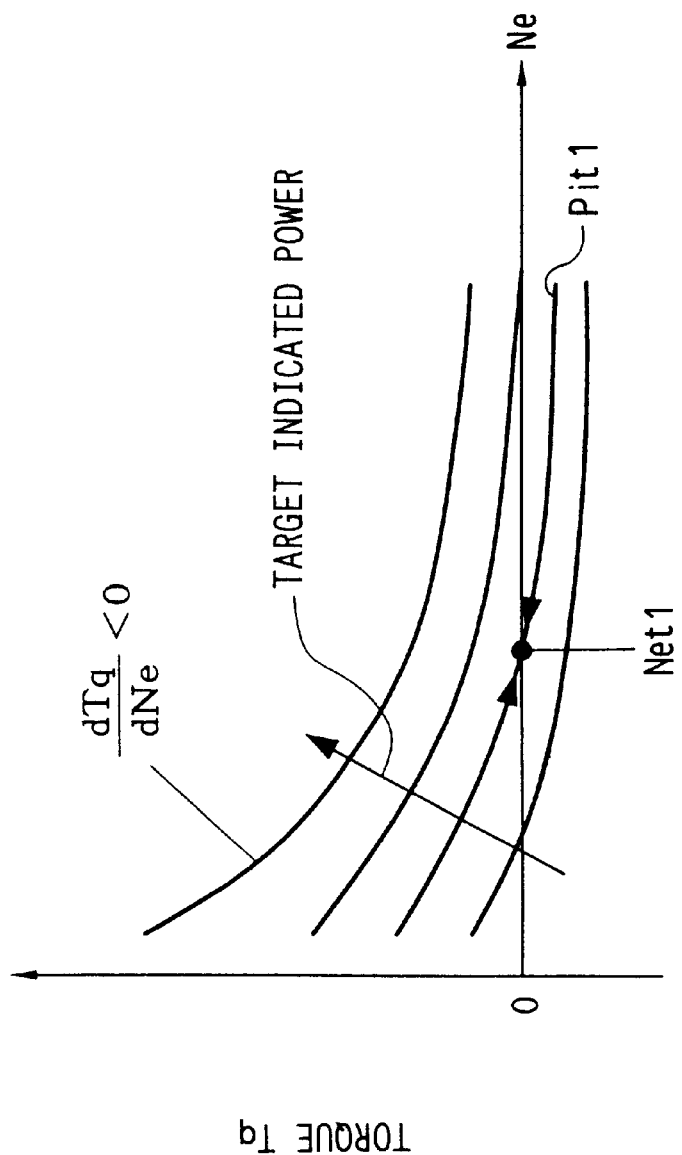
FIG. 2 is a graph showing the output torque relative to the engine speed for explaining a dependence of the output torque upon the engine speed during the target indicated power is constant according to the first embodiment of the present invention.

FIG. 2 shows a relationship among an output torque, the target indicated power and the engine speed. Each line indicates the output torque while the target indicated power is constant. The output torque decreases as the engine speed increases while the target indicated power is constant. In case of changing the engine speed from the target engine speed, the torque demand control provides a self-stabilizing loop. That is, the output torque varies to return the engine speed to the target engine speed. For instance, the target indicated power is maintained on a value Pit1, and the target engine speed is set on a value Net1 as shown in FIG. 2. If the engine speed increases above the target engine speed Net1, the output torque is decreased and the engine speed returns to the target engine speed Net1. If the engine speed decreases below the target engine speed Net1, the output torque is increased and the engine speed returns to the target engine speed Net1. Therefore, in the idling, the controller can maintain the idling speed even if a feedback control of the idling speed is not executed. As shown in FIG. 2, if the target output torque takes a specific value in a specific lower range, the output torque can be controlled to "0".

Figure 3:
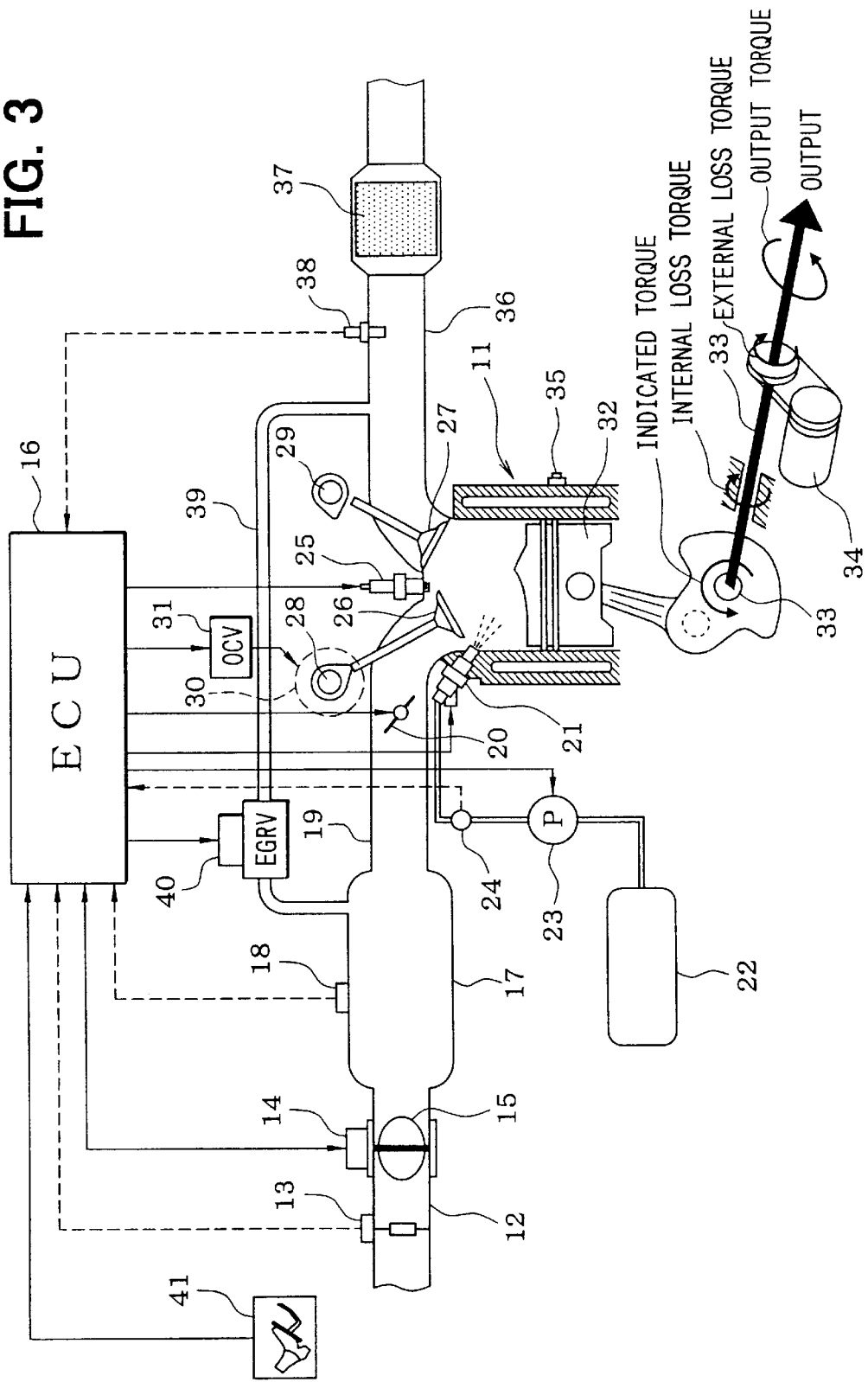
FIG. 3 is a block diagram of the control system according to the first embodiment of the present invention.
Figure 4:
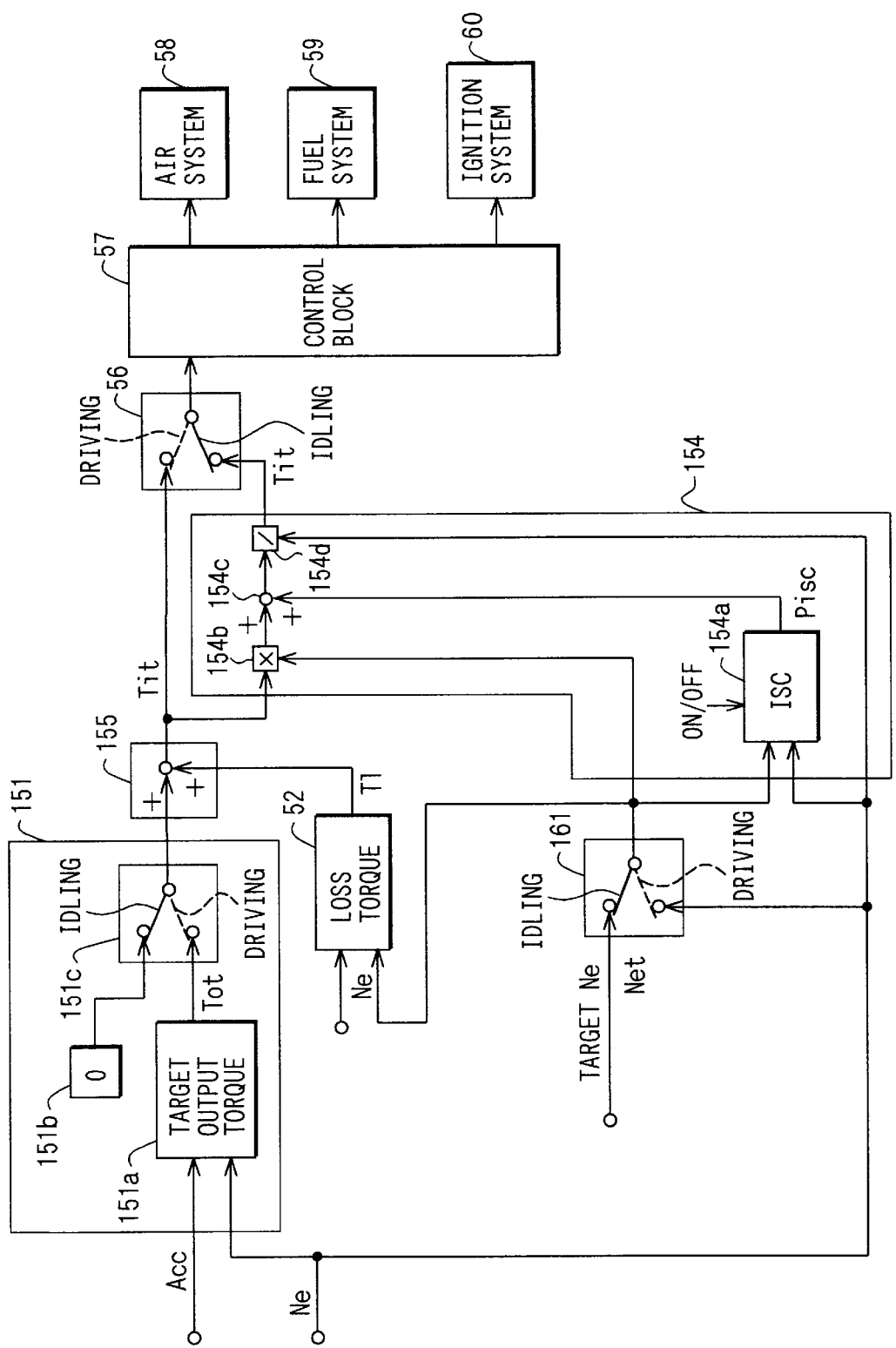
FIG. 4 is a block diagram of an electric control unit according to the first embodiment of the present invention.
Figure 5:
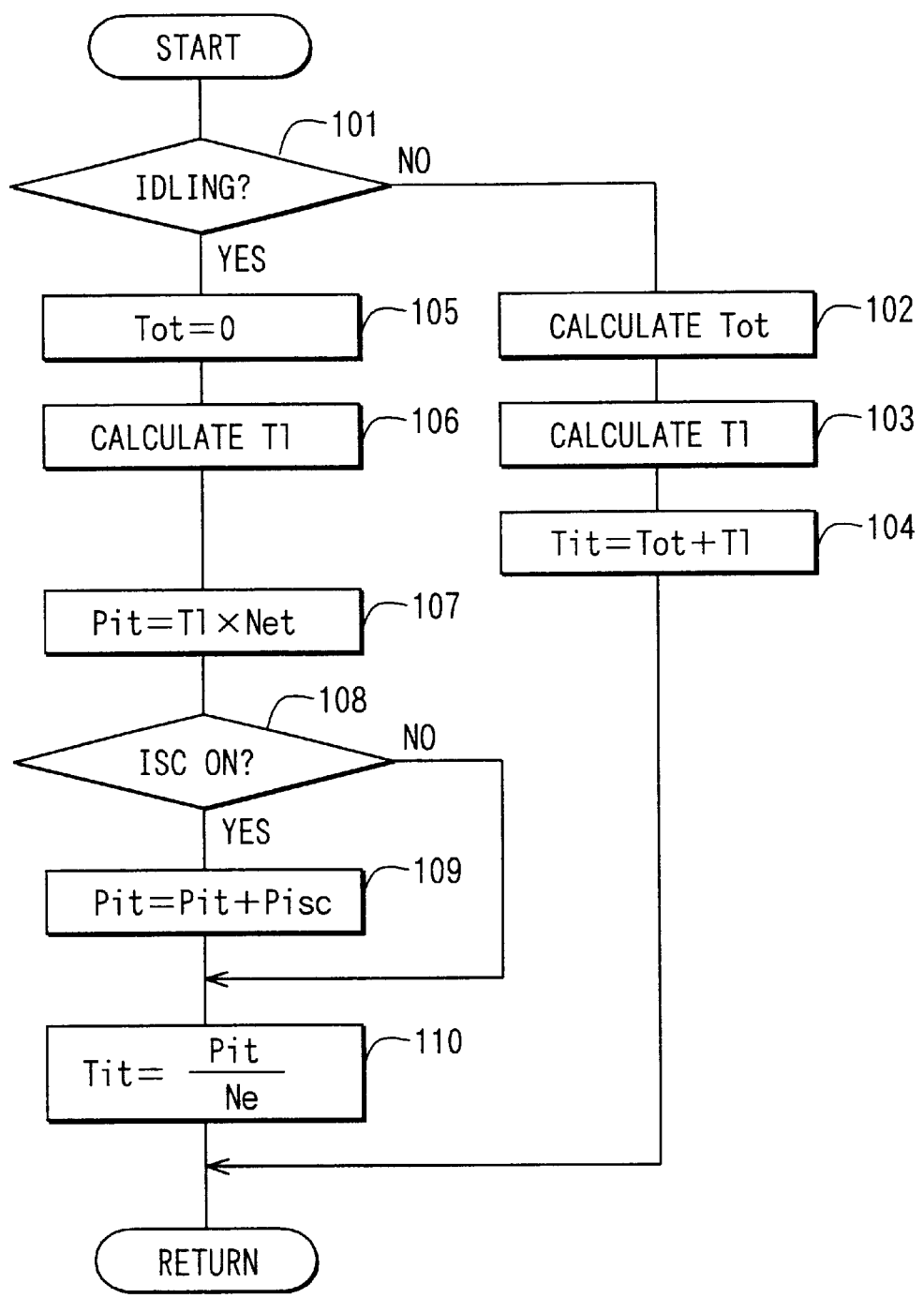
FIG. 5 is a flowchart for calculating the target indicated torque according to the first embodiment of the present invention.

FIGS. 3 through 5 show a first embodiment of the present invention. In the embodiment, the present invention is applied to an internal combustion engine equipped with a direct injection system.

Referring to FIG. 3, the internal combustion engine 11 has a intake pipe 12. The intake pipe 12 has an airflow meter 13 for detecting an intake air amount. A throttle valve 15 for varying an intake air amount is disposed on a downstream side of the airflow meter 13. An opening degree of the throttle valve 15 is varied by a motor 14 that is controlled by an electronic control unit (ECU) 16. A surge tank 17 is disposed on a down stream side of the throttle valve 15. The surge tank 17 has a pressure sensor 18 for detecting an intake air pressure and is connected to intake manifolds 19. A swirl control device 20 for controlling a swirl flow in a combustion chamber is disposed in each of the intake manifolds 19.

A fuel injector 21 is disposed on a respective combustion chamber of the engine 11 for injecting fuel directly into the combustion chamber. The fuel is supplied from a fuel tank 22 and pressurized by the pump 23. A fuel pressure sensor 24 is disposed on a fuel passage between the pump 23 and the injectors 21. A ignition device 25 is disposed on a respective combustion chamber of the engine 11 for igniting a mixture in the combustion chamber.

The engine 11 has at least one of an intake valve 26 driven by an intake camshaft 28 and at least one of an exhaust valve 27 driven by an exhaust camshaft 29. The intake camshaft 28 has a hydraulic variable cam timing actuator (VCT) 30 for varying valve timing in accordance with an operating condition of the engine 11. The VCT 30 is operated by an oil pressure regulated by an oil control valve 31.

A piston 32 of each cylinder of the engine 11 rotates a crankshaft 33. The crankshaft 33 drives accessories 34 disposed on the engine 11 and a drive train of the vehicle. For instance, the accessories 34 include an oil pump in the engine 11, a compressor for an air conditioner, an alternator, a torque converter, a pump for a power steering mechanism and the like.

The engine 11 has a temperature sensor 35 for detecting a temperature of a coolant of the engine 11. The engine 11 has an exhaust pipe 36. A three way catalyst 37 is disposed in the exhaust pipe 36 for purifying an emission in exhaust gas. An air-fuel ratio sensor 38 is disposed on an upstream side of the catalyst 37 for detecting an air-fuel ratio in the exhaust gas. The air-fuel ratio sensor 38 is replaceable with an oxygen sensor for detecting rich or lean condition. An exhaust gas recirculation (EGR) pipe 39 is disposed between the exhaust passage 36 and the surge tank 17 for recirculating a part of the exhaust gas to the intake. An EGR control valve 40 is disposed on the EGR passage 39 for varying an EGR amount.

The ECU 16 is a microcomputer having a ROM for storing programs. The ECU 16 executes a control program for controlling the intake system actuators, the fuel system actuators and the exhaust system actuators based on a calculated target indicated torque and provides a torque demand control system.

FIG. 4 shows a block diagram of the torque demand control system according to the first embodiment. The same reference numbers indicates the same or equivalent elements to FIG. 1 and the explanation is not repeated. In this control system, a target indicated torque Tit is calculated and fed into a control block 57 for determining operating degrees for the actuators 58, 59 and 60. In this embodiment, a calculating method for the target indicated torque is switched in accordance with whether the vehicle is in the driving condition or the idling condition.

When the vehicle is in the driving condition, the target indicated torque Tit is calculated in a block 155 by adding the loss torque Tl to the target output torque Tot. In this embodiment, the target indicated torque Tit is a desired value or a target value of an indicated torque. The indicated torque is a combustion pressure torque generated by combustions of the engine. The indicated torque includes a loss torque that includes an internal loss and an external loss. A torque obtained by subtracting the loss torque from the indicated torque is the output torque (Net torque) that can be outputted on the crankshaft 33 for driving the drive train and the vehicle.

The target output torque Tot is a desired value or a target value of the output torque. The target output torque can be obtained by looking up a predetermined map defined by the engine speed Ne, a vehicle speed V or the like. The target output torque may be obtained based on the operating degree Acc of the accelerator pedal and the engine speed Ne. In this embodiment, the target output torque Tot for driving condition is obtained from a block 151. In the block 151, a block 151a obtains the target output torque Tot and is selected when the vehicle is in the driving condition by a switch block 151c.

The loss torque Tl is obtained by the block 52. In this embodiment, the loss torque Tl is obtained based on the engine speed and other sensor signals. Further, a block 161 selects the target engine speed Net or the engine speed Ne detected. The loss torque Tl is determined based on the engine speed Ne detected during the vehicle is in the driving condition. The loss torque Tl is determined based on the target engine speed Net during the idling so as to eliminate noise of the engine speed. The loss torque Tl includes internal loss in the engine 11 and external loss on the accessories of the vehicle. The internal loss includes a friction loss and a pumping loss. The friction loss of the engine 11 varies in accordance with the condition of the engine such as the engine speed and a viscosity of lubricating oil that depends on an engine temperature. Therefore, it is preferable to determine the friction loss in accordance with present values of the engine speed Ne and the coolant temperature. The friction loss may be obtained by looking up a predetermined two-dimensional map defined by the engine speed Ne and the coolant temperature. The coolant temperature is replaceable with an oil temperature indicative of the engine temperature.

The pumping loss may vary in accordance with an intake pressure and the engine speed. The pumping loss may be obtained by looking up a predetermined two-dimensional map defined by the engine speed Ne and the intake pressure so as to obtain a pumping loss that reflects the present engine condition.

The external loss may be determined based on characteristics of load of the accessories. For instance, the external loss on the compressor for the air conditioner may be obtained by a functional calculation having parameters such as a rotating speed of the compressor. The external loss on the alternator may be obtained by a functional calculation having parameters such as a battery voltage and a field current of a field coil on the alternator. The external loss on the torque converter may be obtained by a functional calculation having parameters such as the engine speed and a turbine speed of the torque converter. The external loss on the power steering may be obtained by a functional calculation having parameters such as a operating degree of a steering wheel or an angular velocity of the operating degree thereof. The loss torque is calculated by summing the above-described internal and external losses.

The target indicated torque Tit in the idling is obtained by the following method. First, the target indicated power Pit is calculated based on the target output torque Tot, the loss torque Tl and the target engine speed Net by using the following expression.

$$Pit = (Tot + Tl) \times Net$$

In the calculation, the loss torque Tl is obtained based on the target engine speed Net by using the similar method described above. In this embodiment, a block 155 calculates the sum of the target output torque Tot and the loss torque Tl. Then, a block 154b in a block 154 multiplies the sum by the target engine speed Net. In the idling, it is not necessary to drive wheels of the vehicle. That is the engine 11 merely rotates without load, therefore the target output torque Tot may be set in "0". In case of setting the Tot in "0", the above expression is modified into Pit=Tl×Net. It is also possible to set the Tot in a small amount to compensate errors of the calculation of the loss torque Tl, and to overcome the loss torque slightly. In this embodiment, a block 151b obtains "0" and the block 151c chooses value "0" during the idling.

During the idling, the engine speed Ne should be maintained in a target engine speed Net by the idling speed control (ISC) employing a feedback method under predetermined circumstances. Therefore, the target indicated torque Tit is obtained by taking an ISC correction torque into consideration. In this embodiment, an ISC correction power Pisc is taken into consideration before power is transformed into torque. The ISC correction power Pisc is obtained by the feedback control method in response to a difference between the target engine speed Net (the target idling speed) and the engine speed Ne detected. The ISC correction power Pisc is added to the target indicated power Pit, and the sum is divided by the engine speed Ne detected to obtain the target indicated torque. The target indicated torque Tit for the ISC is obtained by the following expression: Tit=(Pit+Pisc)/Ne. As a result, it is possible to obtain the target indicated torque so as to maintain the engine speed constant. In this embodiment, a block 154a obtains the ISC correction power Pisc. Then the above expression is executed by blocks 154c and 154d.

On the other hand, if the engine is in transient condition such as an unstable condition just after a starting of the engine and a transitional condition from a driving condition of the vehicle to a stopping condition of the vehicle, the ISC is inhibited. In case of inhibiting the ISC during the idling, the target indicated torque Tit is obtained by just dividing the target indicated power Pit by the engine speed Ne detected. The target indicated torque Tit without the ISC is obtained by Tit=Pit/Ne. In this embodiment, the block 154a quits its calculation in response to an on/off signal of the ISC and obtains "0" as the ISC correction power Pisc during the ISC is inhibited.

The above-described method is provided by a program as shown in FIG. 5. The program is executed in every predetermined time intervals or predetermined crank angles.

In a step 101, it is determined whether the vehicle is in the idling condition or not. For instance, the idling may be determined when an idle switch indicates the throttle valve 15 is fully closed and the engine speed Ne is lower than a threshold value.

If the vehicle is not in the idling, the program proceeds to a branch and executes steps 102, 103 and 104 to obtain the target indicated torque for the driving condition. In the step 102, the target output torque Tot is calculated. In the step 103, the loss torque Tl is calculated based on the engine speed Ne detected. In the step 104, the target indicated torque Tit is calculated by summing the target output torque Tot and the loss torque Tl. The target indicated torque Tit is stored in the ECU 16 and is used for determining the operating degrees for the actuators 58, 59 and 60.

If the vehicle is in the idling condition, the program executes steps 105 through 110 to determine the target indicated torque Tit for the idling. In the step 105, "0" is obtained as the target output torque Tot. In the step 106, the loss torque Tl is calculated based on the target engine speed Net. In the step 107, the target indicated power Pit is calculated.

In the step 108, it is determined that whether the ISC should be executed or not. That is, it is determined that the ISC is permitted or inhibited. If the ISC is permitted, in the step 109, the target indicated power Pit is corrected by the ISC correction power Pisc. If the ISC is inhibited, the step 109 is jumped. In the step 110, the target indicated power Pit is transformed into the target indicated torque Tit for the idling. The target indicated torque Tit is stored in the ECU 16 and is used for determining the operating degrees for the actuators 58, 59 and 60. Therefore, output of the engine varied in accordance with the target indicated torque Tit.

In the embodiment, the target indicated torque Tit is calculated by diving the target indicated power determined based on the target engine speed Net by the engine speed Ne detected. Therefore, the target indicated torque Tit is increased as the engine speed Ne decreases below the target engine speed Net. On the contrary, the target indicated torque Tit is decreased as the engine speed Ne increases over the target engine speed Net. As a result, in case of inhibiting the ISC, it is possible to provide a self-stabilizing feedback loop to maintain the engine speed constant. According to the embodiment, it is possible to maintain the engine speed constant during the idling against the external disturbance. It is also possible to avoid complex adaptive design process and simulations. That is, the target indicated torque Tit for the idling is calculated so as to maintain the target indicated power Pit constant. The constant target indicated power Pit can provide an appropriate self-stabilizing for maintaining the engine speed constant.

Further, the idling speed control with the feedback control method can be combined with the torque demand control method since the ISC correction power Pisc is reflected on the target indicated power Pit.

Figure 6:
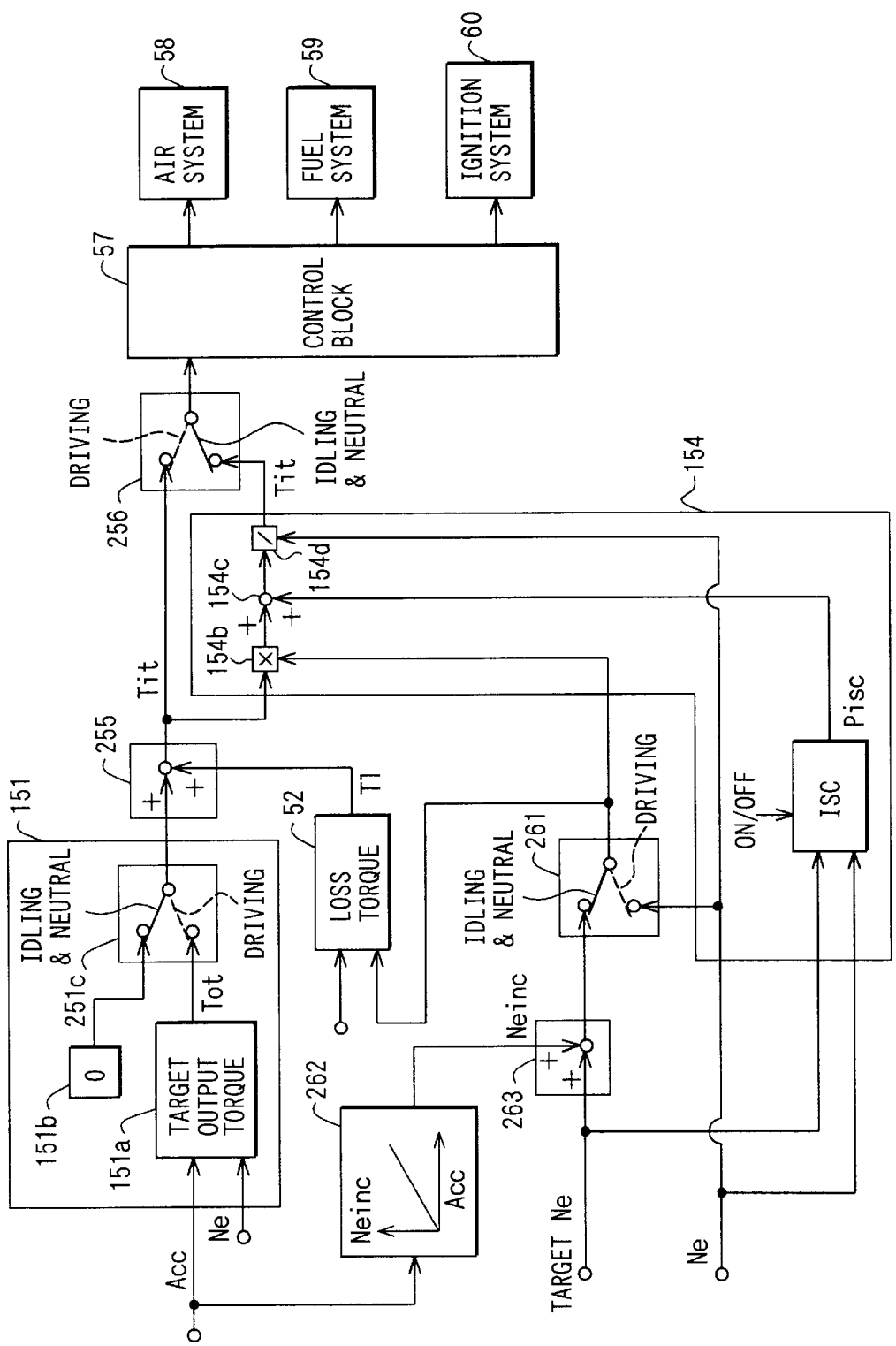
FIG. 6 is a block diagram of an electric control unit according to a second embodiment of the present invention.
Figure 7:
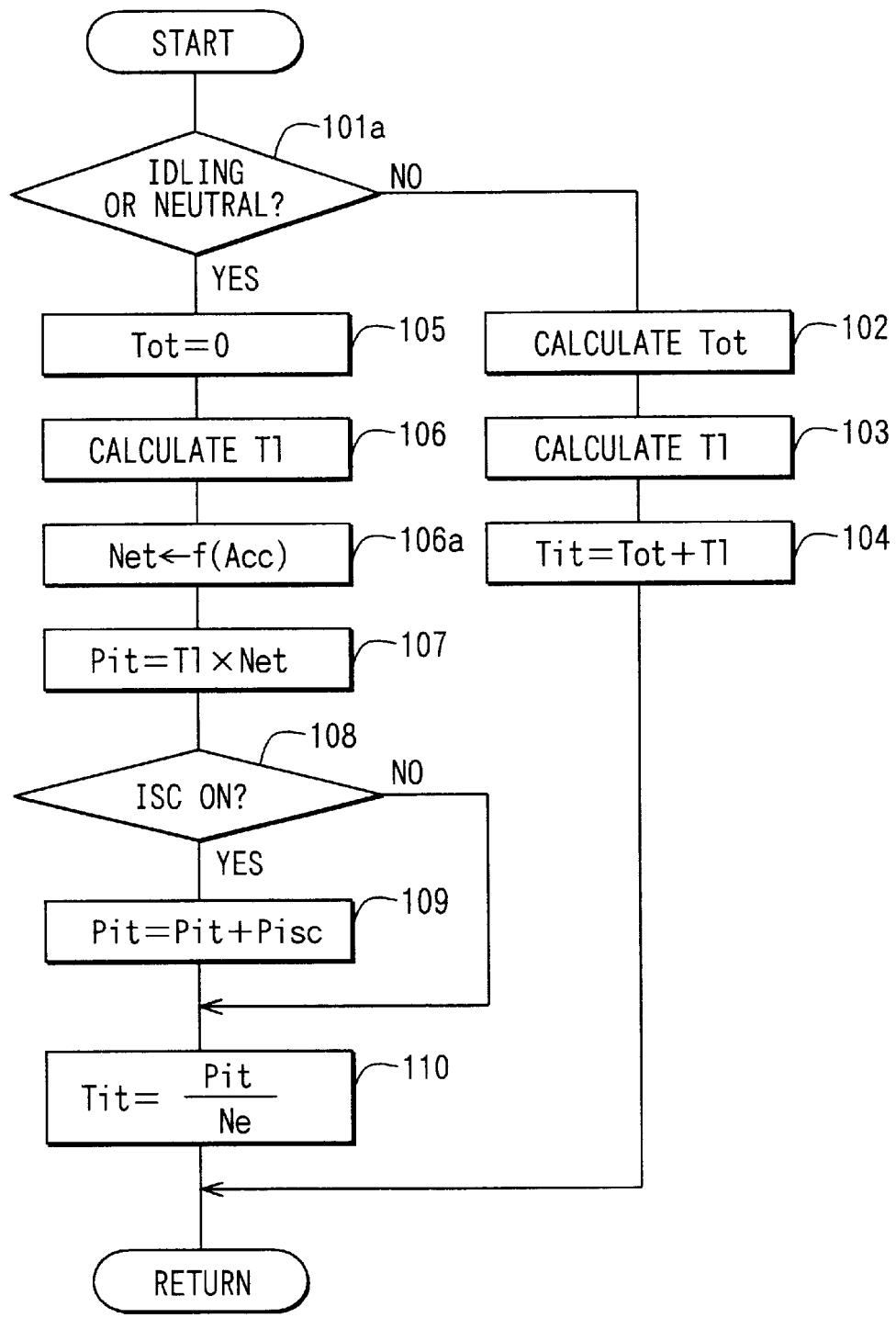
FIG. 7 is a flowchart for calculating the target indicated torque according to the second embodiment of the present invention.

FIGS. 6 and 7 show a second embodiment of the present invention. The same reference numbers to the above-described figures are used for the same or equivalent elements in the second embodiment and the explanation will not be repeated. In this embodiment, a racing operation of the engine 11 takes into a consideration for calculating the target indicated torque. In case of a vehicle equipped with an automatic transmission, the driver may shift the transmission into a neutral range, and operates the engine so as to increase the engine speed without load. This kind of operation is called as the racing. If the racing is detected, it is preferable to increase the engine speed in accordance with the driver's operation. To increase the engine speed quickly, it is desirable to increase the target indicated torque Tit in accordance with the operating degree of the accelerator pedal since the loss torque is increased as the engine speed is increased.

In this embodiment, the switches 251c, 256 and 261 respectively similar to the switches 56, 151c and 161 are switched to the positions shown in FIG. 6 when the vehicle is in the idling or the transmission is in the neutral. Further, the system has correcting blocks 262 and 263. The block 262 obtains an increase degree Neinc of the target engine speed in proportion to the operating degree of the accelerator pedal Acc as shown in the block 262 in FIG. 6. The increase degree Neinc is increased as the operating degree Acc increases. The increase degree Neinc is added on the target engine speed Net by the block 263. As a result, a corrected target engine speed is supplied to the blocks 52 and 154. In this embodiment, the block 154 also input a pre-correction target engine speed Net for calculating the ISC correction power Pisc since the ISC is designed to maintain the engine speed constant.

The ECU 16 executes a program as shown in FIG. 7. The program is similar to the program shown in FIG. 5 except for a step 101a and a step 106a. The step 101a is modified from the step 101 in FIG. 5 so that the program proceeds to the branch of the step 105 when the transmission is in the neutral. The step 106a is added to obtain the target engine speed Net in accordance with the operating degree Acc. As a result, if the accelerator pedal is not operated, the target engine speed Net coincides with a target idling speed. If the accelerator pedal is operated while the neutral, the target engine speed Net is increased over the target idling speed.

According to the second embodiment, similar advantage to the first embodiment is achieved during the transmission is in the neutral. Additionally, the engine 11 can quickly response to the driver's racing operation.

Figure 8:
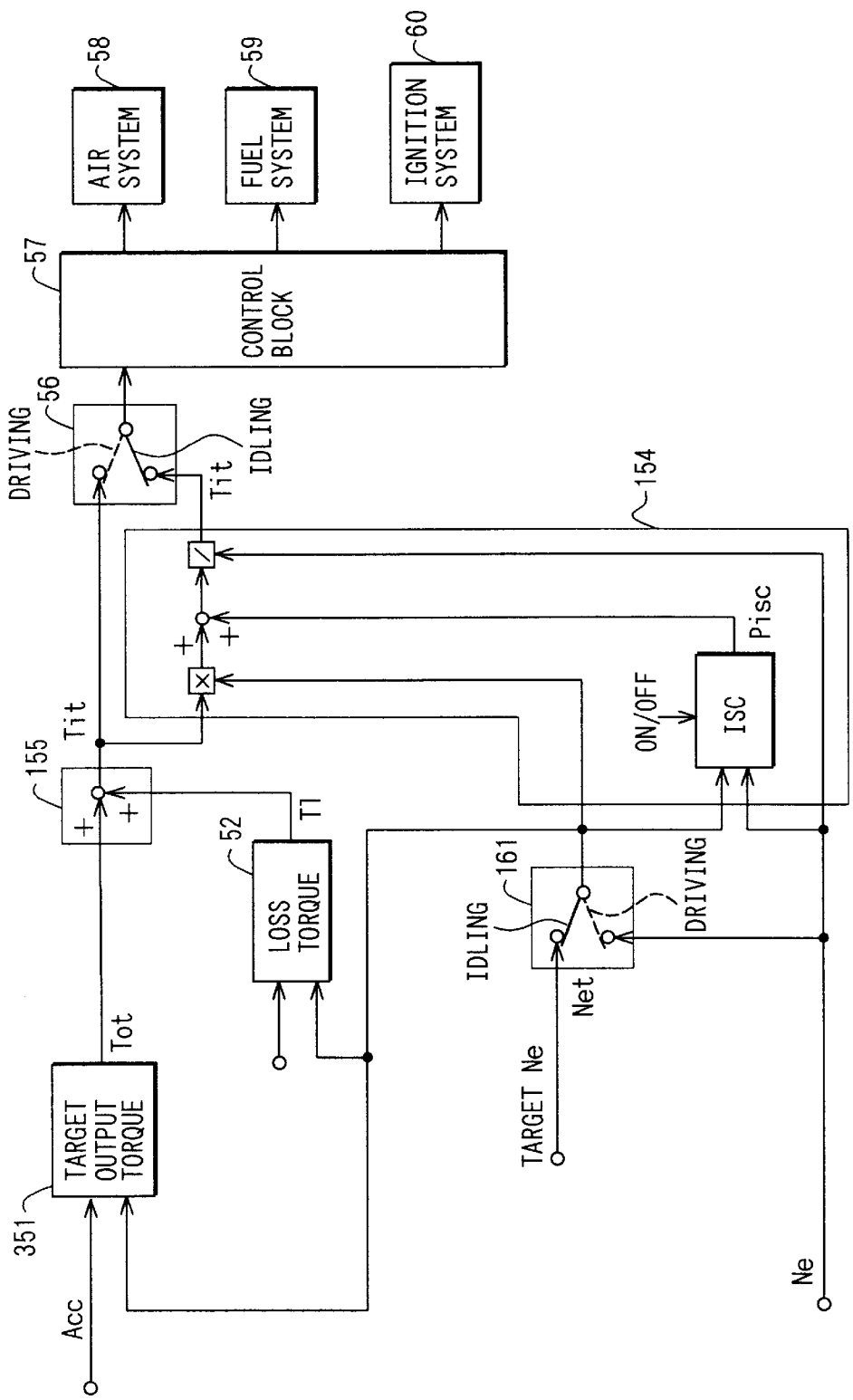
FIG. 8 is a block diagram of an electric control unit according to a third embodiment of the present invention.
Figure 9:
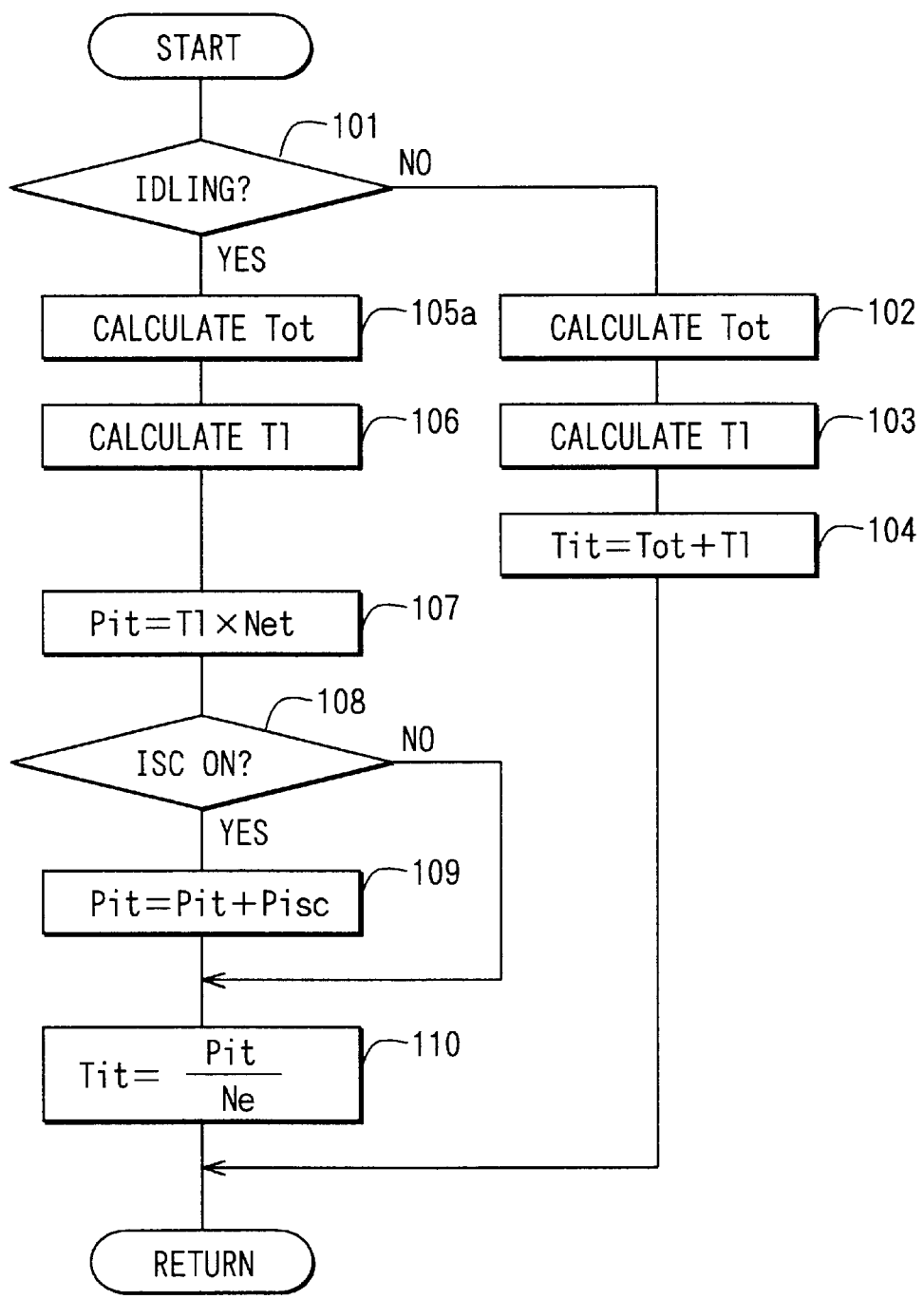
FIG. 9 is a flowchart for calculating the target indicated torque according to the third embodiment of the present invention.

FIGS. 8 and 9 show a third embodiment of the present invention. The same reference numbers to the above-described figures are used for the same or equivalent elements in the second embodiment and the explanation will not be repeated. In this embodiment, a block 351 is provided instead of the block 151 in FIGS. 4 and 6. In this embodiment, the block 351 inputs the selected signal from the switch 161, and calculates the target output torque Tot. Therefore, the target output torque Tot is calculated based on the engine speed Ne detected during the vehicle is in the driving condition. The target output torque Tot is calculated based on the target engine speed Net during the vehicle is in the idling. As a result, the target output torque Tot is obtained as a constant value such as "0" or a small value. In a program, a step 105a is modified from the step 105 in FIG. 5. In the third embodiment, it is possible to achieve the same advantages to the first embodiment.

The present invention may be applied to a vehicle equipped with a manual transmission. In case of the manual transmission, the similar calculations and processes for the idling described above may be executed when the transmission is in a neutral position or a clutch is disconnected. Further, the present invention may be applied to an engine equipped with injectors that supplies fuel into intake ports.

Although the present invention has been described in connection with the preferred embodiments thereof with reference to the accompanying drawings, it is to be noted that various changes and modifications will be apparent to those skilled in the art. Such changes and modifications are to be understood as being included within the scope of the present invention as defined in the appended claims.

What is claimed is:

1. An apparatus for controlling an internal combustion engine comprising:

constant power setting means for setting a target indicated power being substantially constant; and engine speed detecting means for detecting an engine speed;

idling target setting means for setting a target indicated torque for an idling of the engine by transforming the target indicated power based on the engine speed detected by the engine speed detecting means; and controlling means for controlling at least one of actuators that are capable of varying output of the engine in accordance with the target indicated torque when the engine is in the idling.

2. The apparatus for controlling the internal combustion engine according to claim 1, wherein the controlling means controls the actuator based on the target indicated torque when an idling speed control with a feedback control method is inhibited.

3. The apparatus for controlling the internal combustion engine according to claim 1, wherein the constant power setting means provides the target indicated power having a value for maintaining an engine speed at a target engine speed.

4. The apparatus for controlling the internal combustion engine according to claim 1, wherein the constant power setting means provides the target indicated power having a value that corresponds to or overcomes a loss torque that includes internal loss in the engine and external loss when the engine is in the idling.

5. The apparatus for controlling the internal combustion engine according to claim 4, wherein the constant power setting means transforms the loss torque into at least a component of the target indicated power by the target engine speed.

6. The apparatus for controlling the internal combustion engine according to claim 5, further comprising idling speed control means for setting an ISC correction power for controlling an engine speed to a target engine speed when the engine is in the idling, wherein the controlling means controls the actuator based on the target indicated torque and the ISC correction power when an idling speed control with a feedback control method is permitted.

7. The apparatus for controlling the internal combustion engine according to claim 1, further comprising:

target output setting means for setting a target output torque based on an operating degree of an accelerator;

loss torque setting means for setting a loss torque including internal loss in the engine and external loss when a vehicle driven by the engine is in a driving condition; and driving target setting means for setting the target indicated torque for the driving condition, the target indicated torque including a target output torque and a loss torque, wherein the controlling means controls the actuator based on the target indicated torque for the driving condition when the vehicle is in the driving condition.

8. The apparatus for controlling the internal combustion engine according to claim 7, further comprising:

first setting means for setting a first target indicated torque based on the target indicated power;

idling speed control means for setting an ISC correction power for controlling an engine speed to a target engine speed when the engine is in the idling; and second setting means for setting a second target indicated torque based on the target indicated power and the ISC correction power, wherein the controlling means controls the actuator based on the first target indicated torque when an idling speed control with a feedback control method is inhibited, and controls the actuator based on the second target indicated torque when the idling speed control with the feedback control method is permitted.

9. An apparatus for controlling an internal combustion engine comprising:

target output setting means for setting a target output torque based on an operating degree of an accelerator;

target setting means for setting a target indicated torque; and controlling means for controlling at least one of actuators that are capable of varying output of the engine in accordance with the target indicated torque, wherein the target setting means sets the target indicated torque as the sum of the target output torque and a loss torque when a vehicle driven by the engine is in a driving condition, and the target setting means sets the target indicated torque so that a target indicated power is constantly maintained when the engine is in an idling.

10. The apparatus for controlling the internal combustion engine according to claim 9, wherein the target setting means calculates the target indicated torque for maintaining an engine speed in the idling, the target indicated torque is calculated by dividing the sum of the target indicated power and an ISC correction power of an idling speed control by the engine speed, the target indicated power being calculated by multiplying the sum of the target output torque and the loss torque by a target engine speed.

11. The apparatus for controlling the internal combustion engine according to claim 10, wherein the target setting means sets the target output torque to "0" when the engine is in the idling.

12. The apparatus for controlling the internal combustion engine according to claim 9, wherein the engine is equipped with an automatic transmission, wherein the target setting means also sets the target indicated torque so that a target indicated power is constantly maintained when the transmission is in a neutral.

13. The apparatus for controlling the internal combustion engine according to claim 9, wherein the engine is equipped with a manual transmission, wherein the target setting means also sets the target indicated torque so that a target indicated power is constantly maintained when the transmission is in a neutral and a clutch disconnects the transmission.

14. The apparatus for controlling the internal combustion engine according to claim 13, wherein the target setting means calculates the target indicated power based on a target engine speed that is set in accordance with the operating degree of the accelerator when the transmission is in the neutral.

15. A control method for an internal combustion engine, the method comprising:

setting a target indicated power being substantially constant;

detecting an engine speed;

setting a target indicated torque for an idling of the engine by transforming the target indicated power based on the detected engine speed; and varying output of the engine in accordance with the target indicated torque when the engine is in the idling.

16. The control method for the internal combustion engine according to claim 15, further comprising setting an ISC correction power for controlling an engine speed to a target engine speed when the engine is in the idling, wherein the controlling of the engine speed comprises:

varying output of the engine in accordance with the target indicated torque and the ISC correction power when an idling speed control with a feedback control method is permitted; and varying output of the engine in accordance with the target indicated torque when the idling speed control with the feedback control method is inhibited.

17. The control method for the internal combustion engine according to claim 15, wherein the setting of the target indicated power comprises:

setting the target indicated power based on a target engine speed in the idling, the target indicated power having a value that corresponds to or overcomes a loss torque including internal loss and external loss when the engine is in the idling.

18. The control method for the internal combustion engine according to claim 17, further comprising:

setting the target output torque based on a operating degree of an accelerator and an engine speed detected;

setting a target indicated torque based the target output torque and a loss torque including internal loss and external loss under the engine speed detected; and varying output of the engine in accordance with the target indicated torque when a vehicle driven by the engine is in a driving condition.

* * * * *